United States Patent [19]

Giacomel

[11] Patent Number: 4,560,603

[45] Date of Patent: Dec. 24, 1985

[54] COMPOSITE MATRIX WITH ORIENTED WHISKERS

[75] Inventor: Jeffrey A. Giacomel, Arlington, Tex.

[73] Assignee: LTV Aerospace and Defense Company, Dallas, Tex.

[21] Appl. No.: 546,091

[22] Filed: Oct. 27, 1983

[51] Int. Cl.$^4$ .............................................. B32B 3/02
[52] U.S. Cl. ................... 428/86; 156/272.2; 204/155; 428/246; 428/251; 428/284; 428/285; 428/287; 428/294; 428/408; 428/902; 428/119
[58] Field of Search ............... 428/86, 246, 251, 284, 428/285, 287, 294, 902, 119, 408; 156/272.2

[56] References Cited

U.S. PATENT DOCUMENTS

| | | | |
|---|---|---|---|
| 3,808,087 | 4/1974 | Milewski et al. | 428/86 |
| 3,991,248 | 11/1976 | Bauer | 428/408 |
| 4,064,297 | 12/1977 | Power et al. | 428/86 |
| 4,170,677 | 10/1979 | Hutcheson | 428/86 |
| 4,172,916 | 10/1979 | Watson | 428/86 |
| 4,292,100 | 9/1981 | Higashiguchi | 156/276 |
| 4,364,331 | 12/1982 | Foenard | 428/86 |

*Primary Examiner*—James J. Bell
*Attorney, Agent, or Firm*—James M. Cate; S. S. Sadacca

[57] ABSTRACT

A composite material manufacturing process and resulting structure is provided to include high strength material whiskers (20) having a characteristic orientation when placed in an electromagnetic field (22). In one embodiment, whiskers (20) are disposed between lamina (10 and 15) and oriented generally perpendicular to the fiber layers (14 and 18). The whisker (20) orientation is maintained during a curing cycle for the respective matrices (12 and 16) wherein the matrix viscosity allows the whiskers (20) to orient in response to the applied electromagnetic field (22). The whiskers (20) retain their orientation in the resulting laminate to provide improved structural integrity for the laminate.

18 Claims, 3 Drawing Figures

COMPOSITE MATRIX WITH ORIENTED WHISKERS

TECHNICAL FIELD

This invention relates to composite material structures and more particularly relates to combining high strength material whiskers within a conventional composite material for improved structural integrity.

BACKGROUND OF INVENTION

Composites are combinations of two or more materials which retain their identities in the composite structure when combined to form a structural element which takes advantage of selected desirable properties of each component. The constituent materials may be organic, inorganic, or metallic and in the form of particles, rods, fibers, plates and the like. A composite structure forms an effective structure for exploiting the unique properties of certain materials such as the high tensile strength of graphite, boron, or aramid fibers.

Composite materials consist of a continuous matrix phase, which may be formed from an epoxy or polyimide, surrounding a reinforcement structure, generally formed from one of the above high strength materials. The relative roles of the matrix and the reinforcement material for a high performance composite generally assign the high strength and stiffness performance to the reinforcement material, while the matrix serves to transfer stress between materials forming the reinforcement structure and to produce a fully dense composite structure.

The fibers forming the reinforcement structure may be in the form of actual fibers, a filament or fiber of extreme length. The fibers or filaments may also be woven to produce a coherent structure. A lamina is formed by directionally binding an arrangement of fibers in a matrix. A lamina composed of fibers arranged in a uni-directional orientation and in a generally continuous roll is referred to as a "tape". A lamina composed of a cloth in the matrix is referred to as a "fabric".

A composite laminate may be formed by stacking a series of tape and/or fabric lamina and then bonding the lamina together to form a single material system. It should be noted that the lamina have directional strength characteristics from the fiber and/or cloth orientation and the lamina are stacked in a specific orientation wherein the material properties of the laminate are a function of the lamina orientation.

A structural member formed of composite materials may be fabricated using a variety of techniques. In one technique, the laminate is formed directly in the desired structural configuration by forming the lamina over a mandrel or dye in the desired configuration. The stacked lamina would then be cured by heating to a curing temperature appropriate to the matrix material, e.g., 120°–175° C. (250° F.–350° F.) for an epoxy resin matrix.

Metals may also be used to form the matrix where the fibers or cloth are embedded in the molten metal. Yet another fabrication technique uses a process known as pultrusion for forming shapes of uniform cross section, such as rods, bars, I-beams, or channels. In such a process, the matrix, which may be a thermoplastic, and the continuous fiber or cloth are formed in the desired shape while pulling on the formed product and fibers as the composite is formed in the orifice exit region of a shaped die.

All of the above fabrication techniques for composite structures provide structures having generally non-intersecting layers of fibers and/or cloth embedded in a selected matrix material. The matrix region between such parallel layers is subject to separation, known particularly as delamination, where a laminate structure is formed from lamina, and the occurrence of voids and other internal matrix defects leading to stress concentrations which can greatly reduce the strength of the composite. Although some amount of delamination and internal voids and the like can be tolerated, excessive occurrences will cause a structure to be unacceptable and rejected for use. Low production yields lead to high production costs. In addition, any design which tolerates delaminations and voids is generally over-designed when those defects do not occur, yielding an attendant weight and size penalty in anticipation of a defect.

These and other problems in the prior art are overcome by the present invention and an improved process is provided and improved product is obtained wherein inter-lamina strength is greatly increased, stress concentrations may be more readily tolerated and structural integrity is improved.

SUMMARY OF INVENTION

In a preferred embodiment of the present invention, a process is provided for manufacturing a composite material structure including material whiskers in the matrix between fibers of conventional composite structure. The whiskers are provided to have a characteristic orientation when placed in a selected electromagnetic field. When the matrix material is in a viscous condition, the whiskers are subjected to an electromagnetic field effective to place the whiskers in their characteristic orientation relative to the applied field. The matrix is then returned to a viscosity, or to a solid state, effective to retain the whiskers in the selected orientation.

In another embodiment, composite lamina are provided with orientable whiskers disposed therebetween. The whiskers are subjected to an orienting electromagnetic field while the lamina are bonded to form a laminate.

In yet another embodiment, a composite material is provided including material whiskers having a substantially preferred selected orientation between layers of fiber elements in a matrix.

One advantage of the present invention is to transfer stresses from an applied load across regions when the matrix is not available, such as voids or regions of delaminations in laminar structure.

Another advantage is to provide selected oriented strength characteristics at selected locations within a composite structure.

Yet another advantage is to reduce the number of production rejects from unacceptable delaminations.

One other advantage is to reduce internal stress concentrations arising from voids in the matrix.

DETAILED DESCRIPTION

Figure 1:
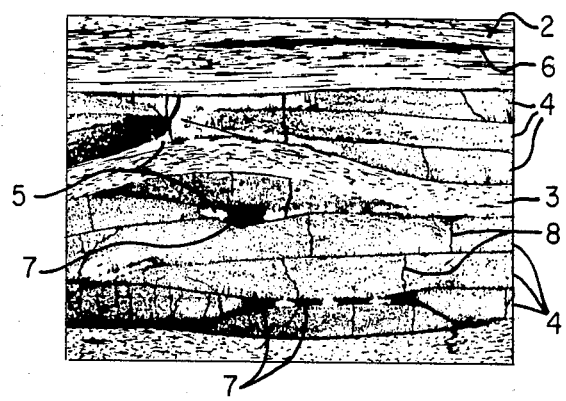
FIG. 1 is a pictorial illustration of defects in a composite structure.

This invention generally involves the introduction of high strength whiskers of selected materials into the matrix between fiber layers of adjoining lamina. The whiskers have dipolar characteristics suitable for preferentially orienting the whiskers in an applied field, generally electromagnetic in nature. A suitable electromagnetic field may then be formed in a directed manner about a structure to affect whisker orientation for improved structural characteristics relating to tensile and shear strength, delamination at lamina interfaces, resistance to crack propagation, and the like.

By whiskers of a material is meant generally a filamentary crystal possessing great strength. Such filamentary crystals are typically only a few micrometers in diameter and are relatively long compared to the diameter. Whiskers approach material perfection, i.e., free of mobile dislocations, stress-raising notches, steps, or inclusions, and can tolerate large strains in bending without plastic deformation. Whiskers may be formed from many suitable crystalline materials, including iron, aluminum, carbon and tungsten, and obtain strengths which may be a 100-fold greater than the strength of the ordinary bulk material.

If a whisker can be impressed with dipolar characteristics, i.e., having opposite magnetic poles or opposite electrical charges at the ends of the crystal, the whisker can be oriented if placed in a suitable directed electromagnetic field. For example, a Martinsite whisker, a pure iron, has a large magnetic permeability and will establish its own dipolar characteristics when placed in a magnetic field to align along the direction of the flux lines of the applied field. For non-magnetic conductive materials, such as aluminum, tungsten, or graphite, an electrical charge might be placed on the whisker to produce a preferred orientation in an applied electromagnetic field. On yet other non-conductive, or dielectric, whisker materials, such as ceramics, it may be possible to create a dipole of separated static charges on the whisker to obtain a preferred orientation.

It will be appreciated that whisker orientation within a given structure may be varied in order to enhance the component structural characteristics. A shaped electromagnetic field may be formed to selectively orient the whiskers. In addition, two whisker types might be selected, one responsive to a magnetic field and one responsive to an electrical field, to obtain whiskers having a perpendicular orientation therebetween from a uniform electromagnetic field.

It will also be appreciated that the composite material selections must be compatible with the electromagnetic field to obtain a preferred whisker orientation. For example, a conventional graphite/epoxy lamina with Martinsite whiskers therebetween oriented by an applied magnetic field would be an acceptable combination. Likewise, a charged conductive whisker placed between lamina of dielectric materials, such as aluminum fiber in an epoxy matrix, in an electrical field would also form an acceptable combination. However, a charged conductive whisker could not be placed adjacent a conductive lamina and retain the necessary electrical charge.

Referring first of FIG. 1, there is shown an illustration of a photomicrographic cross-section of a conventional composite structure. Longitudinal fiber bundles 2 and transverse fiber bundles 4 are formed in a generally planar relationship with matrix 5 therebetween. As shown, carbon fibers 3 are included within the composite.

Several common defect conditions may also be seen in FIG. 1. Delamination 6 occurs between longitudinal fiber bundles 2 at an interface between lamina. Voids 7 exist in matrix material 5 due to incomplete filling of the interstitial volume between fiber bundles or develop during curing of matrix 5. Fiber bundle separations 8 may also occur. Each of these defects represents an interface which is ineffective to transfer applied stresses and which can actually produce stress concentrations within the composite, leading to reduced load bearing capability and to reduced fatigue lifetime.

Figure 2:
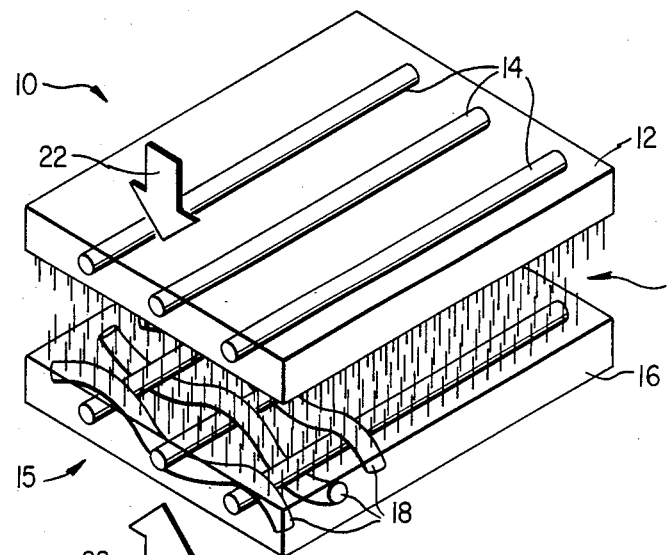
FIG. 2 is a simplified exploded pictorial illustration of one embodiment of the present invention.

Referring now to FIG. 2, there is pictorially depicted one embodiment of the present invention. A first lamina 10 may be provided with uni-directional fibers 14 embedded in matrix 12. As shown, lamina 10 is a tape having uni-directional fibers. A second lamina 15 may be provided as a fabric having fibers 18 woven to form a cloth embedded in matrix 16.

The relative orientation of fibers in the lamina may be varied as a function of the expected load application to obtain a laminate whose material properties are a function of the angles the lamina fibers make with reference to the axis of the principle load.

As depicted in FIG. 2, whiskers 20 are included between lamina 10 and lamina 15. When an external electromagnetic field 22 is applied, whiskers 20 preferentially orient in a characteristic manner determined by the interaction between the applied electromagnetic field 22 and the dipolar or charge characteristic on whiskers 20. As shown in FIG. 2, whiskers 20 are oriented parallel to applied field 22 and perpendicular to fibers 14 and 18.

As depicted in FIG. 2, the length of whiskers 20 are generally less than the distance between fiber layers 14 and 18. Whiskers 20 are complementary to fibers 14 and 18 in that fibers 14 and 18 generally resist the applied tensile loads on lamina 10 and 15 while whiskers 20 provide increased sheer resistance to loads produced from bending stresses and the like. Whiskers 20 also transmit shear stresses between lamina even where a delamination occurs, due to the very high shear strength of whisker material.

Thus, it will be seen from the above discussion that a delamination does not now eliminate the shear strength of the laminate in the area of the delamination. Rather, whisker 20 transfers shear forces between lamina 15 and lamina 10 rather than having the shear forces transferred solely by means of the bond between matrix 16 and matrix 12. Further, voids in matrix 12 or matrix 16 will tend to be occupied by fibers 14 or 18 or by whiskers 20 whereby stresses remain distributed about the void rather than concentrated at edge locations. Thus, stress concentrations are minimized with a resulting improvement in production yield, improvement in fatigue strength, reduction in safety factor requirements, and in general leading to more effective designs.

Figure 3:
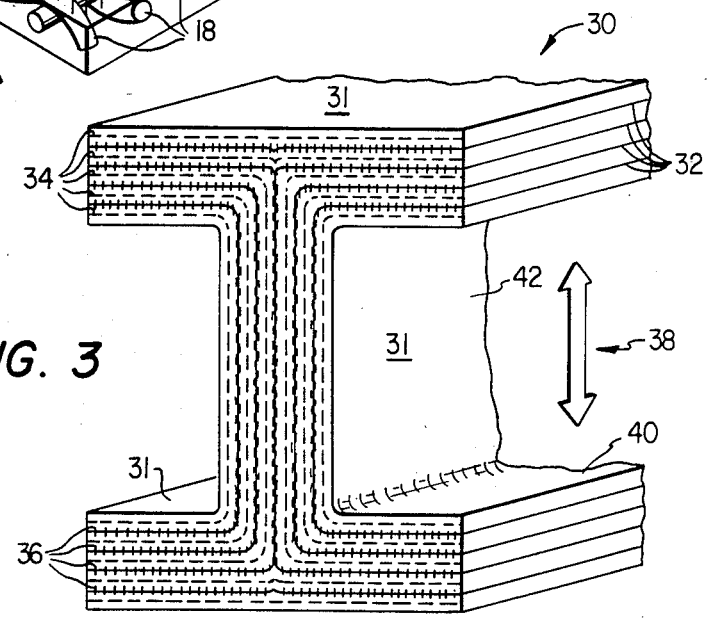
FIG. 3 is a pictorial illustration in cross section of a possible composite structure according to the present invention.

By way of illustration, there is depicted in FIG. 3 an "I-beam" formed of composite material lamina. The composite lamina may be formed with lamima interface surfaces 32 having fibers 34 therebetween. As load bearing structure 30 is formed as a laminate, the various lamina 31 are shaped in a mold (not depicted) until the structural shape has been obtained. In one embodiment, the stacked lamina may be cured by heating to a temperature effective to bond the lamina matrix material together at lamina interfaces 32. Typical cure temperatures range from about 125° C. to about 175° C. for an epoxy matrix, providing respective service temperatures of 82°–120° C. During the cure cycle the matrix material becomes sufficiently viscous that whiskers 36 are movable in response to an applied electromagnetic field forming an oriented structure such as shown in FIG. 3.

In a uniform applied electromagnetic field, a single whisker orientation may be expected as shown in FIG. 3. Thus, oriented whiskers 36 are perpendicular to lamina interface 32 in flange structure 40 and are parallel to lamina interface regions 32 in web structure 42. In a typical "I-beam" application, the applied load direction is shown at 38. Applied load 38 places tensile stresses in web 42 and shear stresses within flanges 40.

The orientation of whiskers 36 resist both of these load applications in the respective structural members in the most efficient manner. Thus, an orientation of whiskers 36 perpendicular to lamina interface 32 is obtained in the flange structure for resisting the shear stresses typically resulting from applied bending loads and whiskers 36 are oriented parallel with lamina interface 32 in web structure 42 to assist in resisting the bending loads applied thereto.

In yet another prospective application, whiskers are included in forming turbine blades of composite structure. The stress patterns in turbine blades are complex due to the stresses imposed by the combination of high radial loads from the rotational velocity and the axial acceleration loads. An electromagnetic field may be designed to obtain the characteristic orientation of the whiskers in a plurality of directions corresponding to the resulting force vectors about the turbine blade. Thus, orientation of the whiskers would be attempted to provide an optimum assistance within the composite structure.

It will be appreciated that the use of oriented whiskers enhances the strength carrying characteristics and reduces the effect of defects between fiber layers when oriented as hereinabove discussed regardless of the process for forming the composite structure. For example, in a process known as pultrusion, the fibers are pulled through an orifice region with the desired aligned fiber arrangement while matrix material is formed thereabout and shaped by the orifice region. Suitable whisker material might be injected with the matrix and subjected to an orienting electromagnetic field as the composite is formed through the orifice while the matrix is still viscous.

It also appears possible to use oriented whiskers with metal matrices in a suitable structure. The metal matrix must be compatible, however, with the whisker characteristic producing whisker orientation in an applied electromagnetic field. For example, embedding a charged whisker in an aluminum matrix would be unsuitable since the conductive aluminum matrix would dissipate the charge. Conversely, aluminum has no substantial magnetic permeability wherein a Martinsitic iron whisker might be oriented between fiber layers while the aluminum is in a molten state.

Thus, composites were initially anticipated to contain whiskers as the primary structural material. The difficulties of whisker handling, material costs and problems with fabricating continuous composites have caused the development of composite structures away from whiskers, using high strength, high modulus fibers such as glass, carbon and graphite, boron oxides, silicon carbide, and aramid filaments. In the present invention, the great shear strength capability of the whisker is utilized by a preferentially orienting the whisker in combination with conventional fibers.

The shear strength of the composite laminate is greatly increased, the effect of delamination of the lamina is greatly reduced and effects of voids in the matrix are reduced. The increased tolerance to many of the common defects which occur in fabricating composite components, e.g., interlaminar voids, excess resin between layers, damaged fibers, inclusion of foreign matter, and other defects tending to reduce shear strength characteristics or to produce stress risers within the lamination is expected to provide improvements in component production yields and reductions in the design factors used to tolerate defects which may exist in the composite structure.

It is therefore apparent that the present invention is one well adapted to attain all of the objects and advantages hereinabove set forth, together with other advantages which will become obvious and inherent from a description of the process and product itself. It will be understood that certain combinations and subcombinations are of utility and may be obtained without reference to other features and subcombinations. This is contemplated by and is within the scope of the present invention.

As many possible embodiments may be made of this invention without departing from the spirit or scope thereof, it is to be understood that all matters herein set forth in the accompanying drawings are to be interpreted as illustrative and not in any limiting sense.

What is claimed is:

1. A process for manufacturing a high strength laminated composite structural material, comprising the steps of:

providing material whiskers characteristically having a preferred orientation in a selected electromagnetic field;

placing fibers of a material useful in composite lamina in a substantially overlapping relationship having a viscous material therebetween to form a composite matrix;

disposing said whiskers in said viscous material;

applying said selected electromagnetic field about said whiskers in a shape effective to selectively orient said whiskers for directionally enhanced interlamina strength and integrity; and curing said composite matrix in said electromagnetic field to form said laminate while retaining said whiskers in said selected direction.

2. A process according to claim 1, wherein said whiskers are formed from a material with magnetic permeability effective to form a dipole when placed in said selected electromagnetic field.

3. A process according to claim 1 wherein said whiskers are selected from electrically conductive material effective to accept an electrostatic charge and said viscous material is substantially dielectric.

4. A process according to claim 1, including the step of:

applying said electromagnetic field in a manner effective to orient said whiskers for resisting externally applied stresses in a shear direction relative to said whisker in selected portions of said structure.

5. A process according to claim 4, wherein said whiskers are oriented generally perpendicular to said fibers in said selected portions of said structure.

6. A process for manufacturing a high strength structural lamination of composite materials, comprising the steps of:
forming a plurality of lamina in a selected structural configuration, each of said lamina having a fiber layer disposed in a matrix with material whiskers therebetween;
forming an electromagnetic field about said structural configuration in a shape effective to selectively orient said whiskers for directionally enhanced interlamina strength and integrity; and
curing said matrix in said electromagnetic field to form said plurality of lamina to a laminate effective to retain said selectively oriented whiskers in said orientation.

7. A process according to claim 6, wherein said at least one selected direction is effective to transfer stresses across regions of delaminations between lamina.

8. A process according to claim 6, wherein said whiskers are formed from a material with magnetic permeability effective to form a dipole when placed in said selected electromagnetic field.

9. A process according to claim 6 wherein said whiskers are selected from electrically conductive material effective to accept an electrostatic charge.

10. A process according to claim 6, wherein the step of transforming said plurality of lamina to a laminate further includes the steps of:
forming said matrix with a viscosity effective for orienting said whiskers therein; and
increasing said viscosity to a degree effective to retain said whiskers in said at least one selected direction.

11. A process according to claim 6, including the step of:
applying said electromagnetic field in a manner effective to orient said whiskers for resisting externally applied stresses in a shear direction relative to said whiskers in selected portions of said structure.

12. A process according to claim 6, wherein said whiskers are oriented generally perpendicular to said fibers in selected portions of said structure.

13. A high strength laminated composite structural material comprising:
at least two fiber element layers disposed in parallel overlapping relationship within a surrounding matrix; and
whiskers of a selected material adapted to be responsive to an applied shaped electromagnetic field and spaced between said fiber element layers in said matrix, said whiskers having a selected orientation in said matrix from said shaped field effective to directionally enhance strength and integrity of said laminated material.

14. A composite material according to claim 13, wherein said whiskers are formed from a material with magnetic permeability effective to form a dipole when placed in a selected electromagnetic field.

15. A process according to claim 13, wherein said whiskers are selected from electrically conductive material effective to accept an electrostatic charge.

16. A composite material according to claim 13, wherein said selected whisker orientation is effective to resist externally applied stresses in a shear direction relative to said whisker in selected portions of said structure.

17. A composite material according to claim 13, wherein said material structure comprises a plurality of lamina forming a laminate.

18. A composite material according to claim 17, wherein said selected orientation is effective to transfer stresses across regions of delaminations between lamina.

* * * * *